United States Patent

Kobayashi et al.

[11] Patent Number: 5,502,960
[45] Date of Patent: Apr. 2, 1996

[54] STEEL CORD FOR REINFORCEMENT OF RUBBER PRODUCTS

[75] Inventors: Yoshiro Kobayashi, Kato; Katsutoshi Saita, Ono; Yoshinobu Takegawa, Ono; Koichi Hinoura, Ono, all of Japan

[73] Assignee: Tokusen Kogyo Company Limited, Hyogo, Japan

[21] Appl. No.: 302,987

[22] Filed: Sep. 12, 1994

Related U.S. Application Data

[63] Continuation of Ser. No. 995,004, Dec. 22, 1992, abandoned.

[30] Foreign Application Priority Data

Dec. 27, 1991 [JP] Japan .................. 3-358017

[51] Int. Cl.$^6$ ..................... D02G 3/48
[52] U.S. Cl. .................. 57/236; 57/242; 57/311; 57/902
[58] Field of Search ............... 57/200, 206, 212, 57/223, 227, 236, 241, 242, 311, 902

[56] References Cited

U.S. PATENT DOCUMENTS

| | | |
|---|---|---|
| 2,055,948 | 9/1936 | Selquist ................... 57/311 X |
| 2,998,696 | 9/1961 | Player . |
| 3,315,457 | 4/1967 | Stirn ..................... 57/212 X |
| 4,258,543 | 3/1981 | Canevari et al. . |
| 4,333,306 | 6/1982 | Yamashita et al. . |
| 4,385,486 | 5/1983 | Iwata et al. . |
| 4,399,853 | 8/1983 | Morimoto et al. . |
| 4,464,892 | 8/1984 | Kleijwegt . |
| 4,506,500 | 3/1985 | Miyzuchi et al. . |
| 4,545,190 | 10/1985 | Rye et al. . |
| 4,644,989 | 2/1987 | Charvet et al. . |
| 4,738,096 | 4/1988 | Hatakeyama et al. . |
| 4,836,262 | 6/1989 | Nishizawa et al. . |
| 4,938,015 | 7/1990 | Kinoshita . |
| 5,020,312 | 6/1991 | Watakabe . |
| 5,109,661 | 5/1992 | Okamoto et al. . |
| 5,118,568 | 6/1992 | Okamoto et al. . |
| 5,162,062 | 11/1992 | Carroll et al. . |

FOREIGN PATENT DOCUMENTS

| | | |
|---|---|---|
| 0143767 | 6/1985 | European Pat. Off. . |
| 0175633 | 9/1985 | European Pat. Off. . |
| 0225055 | 6/1987 | European Pat. Off. . |
| 0387803 | 9/1990 | European Pat. Off. . |
| 0433962 | 12/1990 | European Pat. Off. . |
| 8027092 | 12/1980 | France . |
| 2676466 | 11/1992 | France ................... 57/902 |
| 55-90622 | 7/1980 | Japan . |
| 62-41339 | 2/1987 | Japan . |
| 1-250482 | 10/1989 | Japan . |
| 2-20239 | 1/1990 | Japan . |
| 1000823 | 8/1965 | United Kingdom . |
| 2034363 | 6/1980 | United Kingdom . |
| 2098251 | 11/1982 | United Kingdom . |
| 2081765 | 2/1987 | United Kingdom . |
| 88/05624 | 11/1988 | WIPO . |
| 91/04370 | 4/1991 | WIPO . |

Primary Examiner—Joseph J. Hail, III
Attorney, Agent, or Firm—Wenderoth, Lind & Ponack

[57] ABSTRACT

A steel cord for reinforcing automobile tires is composed by intertwisting at least one material wire having small spiral-like curls and 1 to 5 straight material wires. This restricts the ratio of fracture elongation of the two kinds of material wires as well as the elongation percent of the cord at 5 kg loading and improves the stability of twist, the fatigue resistance, the penetrability of a rubber compound and the handling workability.

10 Claims, 5 Drawing Sheets

Prior Art

Prior Art

Prior Art

STEEL CORD FOR REINFORCEMENT OF RUBBER PRODUCTS

This application is a continuation of now abandoned application, Ser. No. 07/995,004, filed on Dec. 22, 1992.

BACKGROUND OF THE INVENTION

This invention relates to a steel cord to be used for reinforcement of rubber products such as automobile tires, conveyors belts, etc.

Generally, this kind of steel cord is constructed by twisting a plural number of material wires and such steel cord is used as reinforcing material of automobile tires after being covered with a rubber compound in the state where a plural number of cords are arranged in parallel at prescribed intervals.

By the way, essential conditions required of this kind of steel cord are (1) to have excellent mechanical strength, (2) to be in good contact with rubber compound chemically and physically, and (3) to ensure good penetration of rubber compound to the inside of the steel cord.

The conventional steel cords 9 are of the so-called closed construction (1×2 to 1×6 construction) in which a plural number of material wires are intertwisted in close contact with one another as shown in FIGS. 6a–6e. Of those steel cords, each of the steel cords 9 indicated in FIGS. 6b–6e has a closed cavity D at the center of the cord formed by a plural number of material wires 10, 10 . . . constituting the steel cord. For that reason, if you pressurize and vulcanize a plural number of steel cords by pinching them between two rubber sheets, the rubber compound simply covers the periphery of the cords but does not penetrate into the cavity D. As a result, the complex sheet formed will not become a complete complex with the rubber (i.e. will not be fully integrated with the rubber) because a continuous cavity D exists longitudinally at the central part of the cord.

Figure 6A:
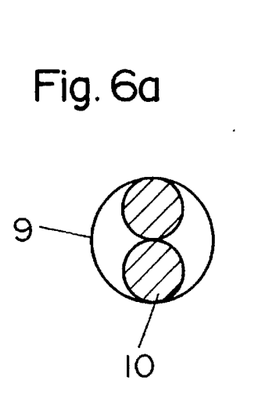
FIGS. 6a–6e are schematic cross-sectional views of conventional 1×n (n=2 to 6) closed twisted cords.
Figure 6B:
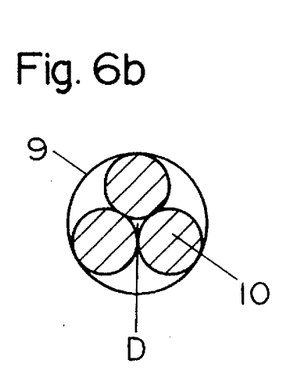
Figure 6C:
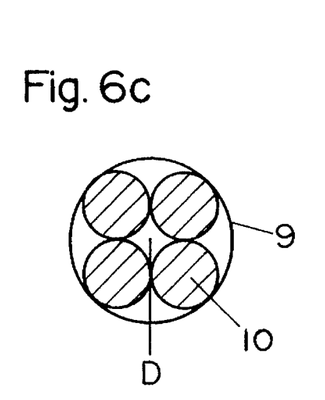
Figure 6D:
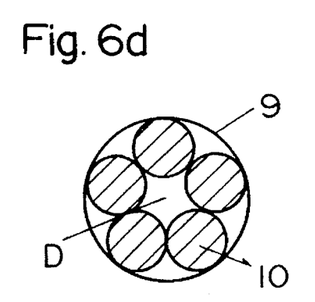
Figure 6E:
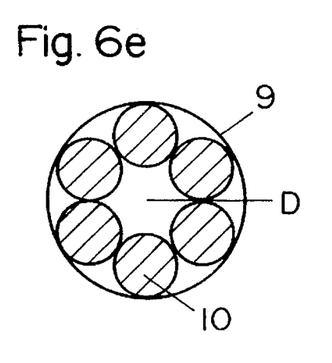

Moreover, the steel cord 9 of 1×2 construction indicated in FIG. 6a fails to become a complete complex with the rubber in the same way as the steel cord of 1×3 to 1×6 construction because the two material wires are inclose contact with each other continuously in the longitudinal direction preventing penetration of rubber compound in this part of close contact.

For that reason, in rubber products using the conventional type of steel cord 9 such as automobile tires, for example, the water content, produced as a result of condensation of gas emitted by the rubber compound or as a result of water which penetrated through cuts in the tire, will pass through the cavity in the longitudinal direction at the center of the cord, corroding the steel cord and sharply reducing its mechanical strength. Moreover, the tire is subject to the so-called "separation phenomenon" in which the rubber compound and the steel cord are separated from each other as a result of a drop in adhesion between the steel cord and the rubber compound. Furthermore, if repetitive bending stress is exerted on the rubber product having the steel cord 9, the steel cord will produce fretting wear to remarkably reduce its fatigue resistance, because the respective material wires 10, 10 . . . adjacent to one another are in linear contact with one another and the rubber compound hardly penetrates between those material wires.

Figure 7A:
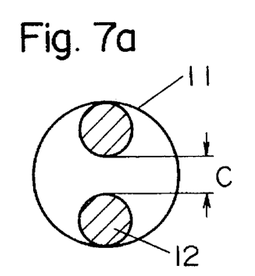
FIGS. 7a–7e are schematic cross-sectional views of conventional 1×n (n=2 to 6) open twisted cords.
Figure 7B:
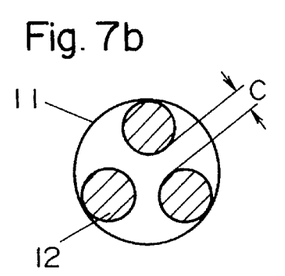
Figure 7C:
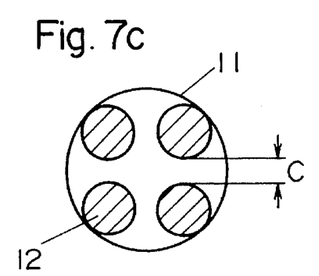
Figure 7D:
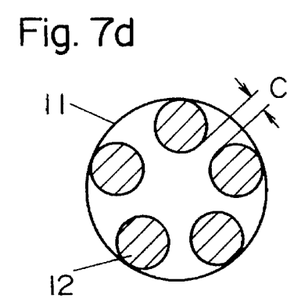
Figure 7E:
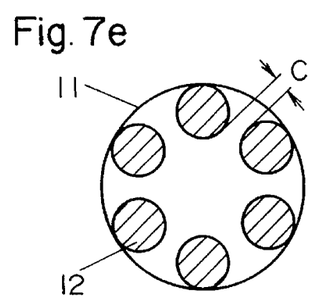

Under such circumstances, a proposal was made in recent years to provide a steel cord 11 of so-called open construction (1×2 to 1×6 construction) in which the respective material wires 12, 12 . . . are intertwisted such that a clearance C is provided among them while arranging the respective material wires in a larger space as shown in FIGS. 7a–7e (for example, see JP 55-90692, which is exemplified in FIGS. 7b–7d).

To ensure sufficient penetration of rubber compound also in the central part of the cord in the open twisted cord 11, the clearance C between the respective material wires must be at least equal to 0.01 mm.

Figure 8A:
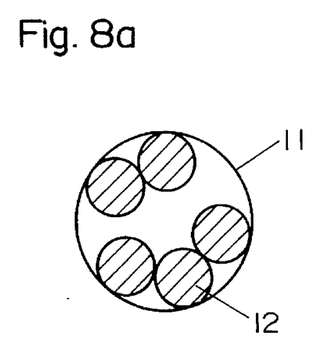
FIGS. 8a and 8b are schematic sectional views showing states of deviation of the material wires of FIG. 7d.
Figure 8B:
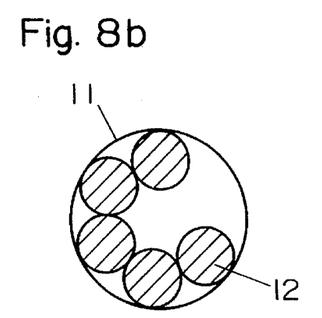

However, if the clearance C is set sufficiently large, the steel cord is beset by the following problems:

Namely, the steel cord provides a large free space for movement of material wires because the material wires adjacent to one another are in contact only about once in one twist pitch. Consequently, in the case of a steel cord 11 as shown in FIG. 7d, for example, an offset of the material wires is produced to make the twist uneven in the longitudinal direction as shown in FIGS. 8a–8b, and the steel cord is liable to buckle when repetitive bending stress acts on it. Moreover, the steel cord 11 was difficult to handle because of a large elongation of the cord under a low load and because the rubber compound did not penetrate to the inside of the cord sufficiently well because the clearance C decreased under the influence of the tension at low loads (5 kg, also applicable hereinafter) applied at the time of forming of the complex sheet.

SUMMARY OF THE INVENTION

The object of the present invention is to provide a steel cord for reinforcement of automobile tires with excellent low-load elongation, excellent flexibility and improved handling workability. Another object is to provide a steel cord for reinforcement of automobile tires with improved fatigue resistance so that it produces hardly any buckling or fretting wear even with repeated bending stresses. Still another object is to improve the penetrability of a rubber compound so that the steel cord fully integrates with the rubber material.

To achieve these objects, the steel cord of the present invention is composed by intertwisting at least one material wire having small substantially spiral curls (or spiral-like curls) and 1 to 5 straight material wires, thus restricting the ratio of fracture elongation of the material wires as well as the elongation percent of the cord at 5 kg loading.

Namely, a first example of the present invention is a steel cord of 1×n (n=2 to 6) construction composed by twisting material a wire having small spiral-like curls with straight wires constructed in such a way that the ratio WE of the fracture elongation $\epsilon_1$ of the material wire having small spiral-like curls to the fracture elongation $\epsilon_2$ of the material wires having only twist curls (i.e. curls resulting from the intertwisting) is 1.08 to 1.70 and that the elongation percent SL of the cord at 5 kg load is 0.13 to 0.50.

Moreover, a second example of the present invention is a steel cord of 1×3 construction of the steel cords composed by twisting a material wire having small spiral-like curls with straight wires constructed in such a way that the ratio WE of the fracture elongation $\epsilon_1$ of the material wire having small spiral-like curls to the fracture elongation $\epsilon_2$ of the material wires having only twist curls is 1.10 to 1.30 and that the elongation percent SL of the cord at 5 kg load is 0.15 to 0.20.

The ratio WE is obtained by first measuring the elongation up to breaking of two kinds of material wire taken out by loosening the twist of the steel cord and also measuring their ratio.

By the way, it is enough to have at least one piece of the material wire having small spiral-like curls among the material wires composing the cord. However, there are cases where the number of material wires having small spiral-like curls is increased to 2 if the number of materials composing the cord increases. In that case, it is more effective if you arrange the wires in such a way that the material wires having small spiral-like curls will not come into contact with each other. It is undesirable to increase the number of the material wires having small spiral-like curls too much because it not only increases the low-load elongation of the cord but also produces a risk of preventing penetration of the rubber compound to the inside of the cord and destabilizes the twist.

Figure 1:
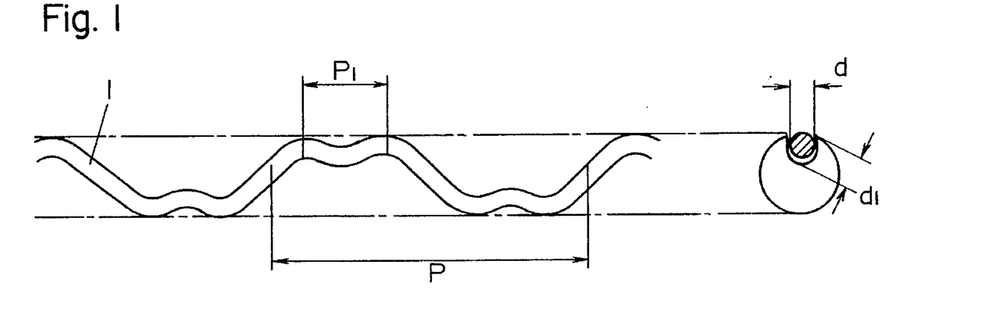
FIG. 1 is a schematic explanatory drawing of a material wire having small spiral-like curls.

The material wires having spiral-like curls have a complicated shape provided with two different kinds of curl i.e. spiral-like curls due to twisting (i.e. twisting curls) of the cord and small spiral-like curls having a pitch $P_1$ as shown in FIG. 1 after the twist of the steel cord is loosened. Moreover, even the straight material wires are provided with spiral curls due to twisting after the twisting of the cord.

Moreover, in the steel cord, it is most suitable to set the pitch P of the twist curls at 8 to 16 mm from the viewpoints of productivity, cord strength, stability of twist, flexibility, fatigue resistance and handling workability, and to set the material wire diameter at 0.10 to 0.40 mm from the viewpoints of strength and flexibility.

In the material wires having small spiral-like curls, the shape of such small spiral-like curls may not necessarily be the same as the spiral shape due to twisting of cord but is selected as desired. However, that shape shall preferably be selected in a way to have the relation of $P_1=0.1$ P to 0.7 P and the relation of $d_1=$ (d+2/100 mm)–(d+2/10 mm) between the material wire diameter d and the outside diameter $d_1$ of the curl of the material wires having small spiral-like curls.

Moreover, it is desirable that the average number of times of contact in one twist pitch between the material wire having small spiral-like curls and the material wires having only curls due to twisting be about 1.4 to 4.0 times.

By the way, the numeral restriction in the above construction was obtained by a number of experiments for the following reasons:

If the elongation ratio at breaking, WE ($=\epsilon_1/\epsilon_2$) is smaller than 1.08, the rubber compound does not penetrate sufficiently well to the inside of the steel cord when you pressurize and vulcanize a plural number of steel cords by pinching them between two rubber sheets. Moreover, if WE is larger than 1.70, it deteriorates the stability of twist, causing not only a drop in fatigue resistance and of cord strength but also an increase in low-load elongation. The ratio WE has therefore been set in the range of 1.08 to 1.70.

Moreover, the elongation percent SL of the cord at 5 kg loading is a restrictive condition imposed on the cord because the elongation of the cord cannot necessarily be limited when a plural number of material wires are intertwisted even if the ratio of elongation among material wires is fixed. If the elongation percent SL of the cord is smaller than 0.13, the rubber compound does not penetrate sufficiently to the inside of the steel cord during pressurization and vulcanization. If it is larger than 0.5, it causes an increase in low-load elongation with negative influences on the workability and frequent buckling in a repetitive fatigue test such as a tensile test, a compressive test, etc. The elongation percent SL was therefore set in the range of 0.13 to 0.50.

Moreover, also in the steel cord of 1×3 construction in the second example, a range providing more favorable effects was limited for the same reasons as above.

In the steel cord for reinforcement of automobile tires of the present invention composed as mentioned above, the elongation of the cord at extremely low loads is restricted and the clearance between material wires is also maintained at a fixed level because there exist extremely small clearances between the material wires having small spiral-like curls and the adjacent material wires. If you pressurize and vulcanize a plural number of the cords by pinching them between two rubber sheets at prescribed intervals, the rubber compound undergoes good penetration to the inside of the cords through the fine clearances formed between the material wires. As a result, the steel cord is covered with the rubber compound on the entire surface of each material wire and becomes fully integrated with the rubber compound, thus preventing corrosion of the cord and also preventing any separation phenomenon between the rubber compound and the cord and fretting wear among material wires. The handling workability of the cord also improves because the low-load elongation of the cord decreases. For example, if there is a large low-load elongation of the cord, it produces disadvantages such as puncturing of the reel during winding of the steel cord on the reel, waving of the sheet during formation of the complex sheet, etc. Such disadvantages can be eliminated with the present invention. Moreover, the present invention provides excellent effects in remarkably improving the fatigue resistance of the steel cord with hardly any production of buckling even upon the application of repetitive bending stress thanks to an excellent form of twisting.

DETAILED DESCRIPTION OF THE INVENTION

FIG. 1 is a schematic explanatory drawing of a material wire having small substantially spiral (or spiral-like) curls constituting the steel cord for automobile tires of the present invention. In the drawing, d is the material wire diameter and $d_1$ represents the outside diameter of the spiral-like curls.

To produce the small spiral-like curls in the material wire 1, we passed the material wire among a plural number of pins provided on a curling device and rotated that curling device at a high speed with the material wire as a pivot to provide the passing material wire with small spiral-like curls, and then passed the wire among a plural number of curling cone pins provided immediately before the converging point of the twist to provide it with spiral curls for twisting.

Another way of producing the small spiral-like curls is to have the material wire bitten by gears, etc. to provide it with wavy curls and twisting that material wire to provide it with the small spiral-like curls.

Figure 2A:
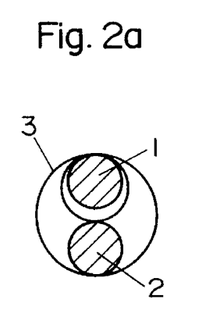
FIGS. 2a–2f are schematic cross-sectional views of steel cords of an example according to the present invention.
Figure 2B:
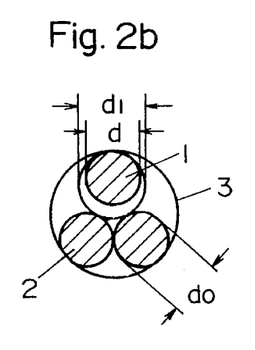
Figure 2C:
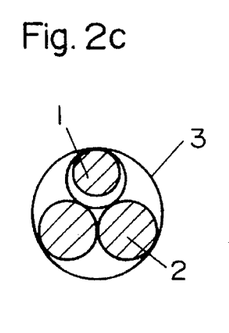
Figure 2D:
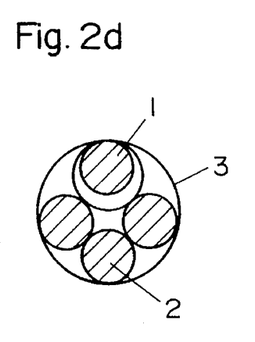
Figure 2E:
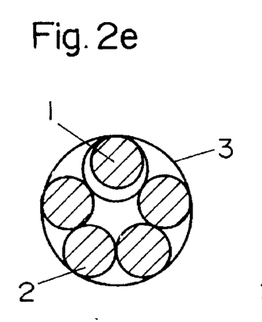
Figure 2F:
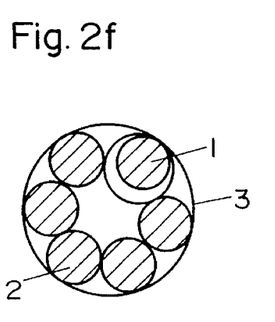
Figure 3A:
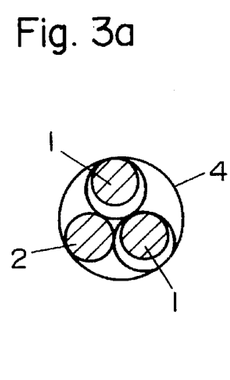
FIGS. 3a–3d are schematic cross-sectional views of steel cords of another example according to the present invention.
Figure 3B:
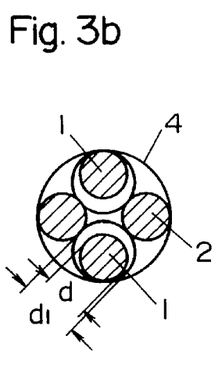
Figure 3C:
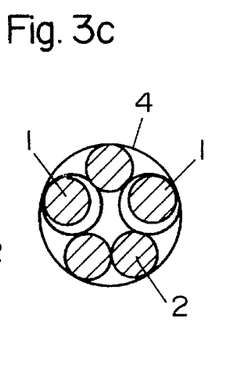
Figure 3D:
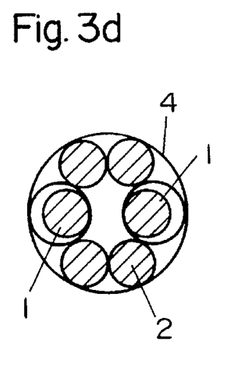
Figure 4:
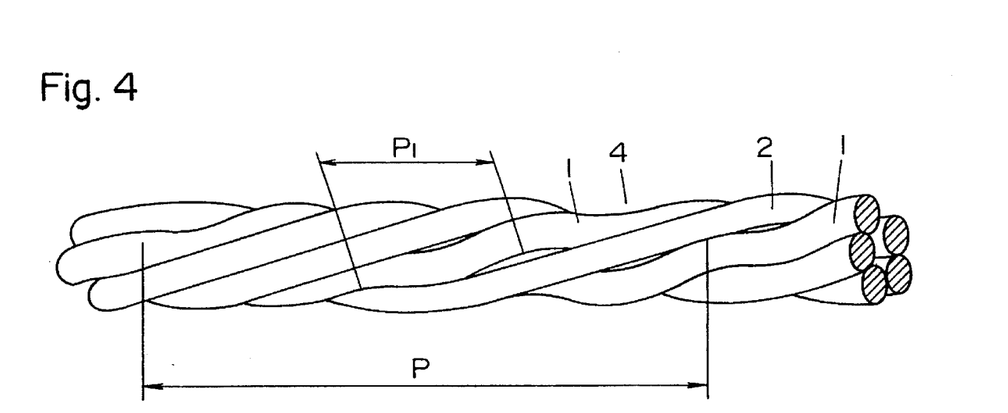
FIG. 4 is a schematic side view of the steel cord shown in FIG. 3c.

One of the material wires 1 was stranded with 1 to 5 straight material wires 2 by means of a buncher stranding machine used as a double stranding machine to constitute the steel cords of the present invention as shown in FIGS. 2a–2f. FIG. 2a is a steel cord of 1×2 construction, FIGS. 2b and 2c are steel cords of 1×3 construction, FIG. 2b showing the different diameters d and de of the material wire 1. FIG. 2d is a steel cord of 1×4 construction, FIG. 2e is a steel cord of 1×5 construction and FIG. 2f is a steel cord of 1×5 construction.

Moreover, FIGS. 3a–3d are steel cords according to another example. Those steel cords 4 are produced by stranding two of the material wires 1 with 1 to 4 straight material wires in the same way as above.

The material wires 1, 2 constituting the steel cords 3, 4 have a spiral shape formed as a result of stranding of the cords.

The outside diameter $d_1$ of the curl of the material wire 1 in the steel cords is in the range of $d_1=(d+2/100$ mm$)$ to $(d+2/10$ mm$)$. Moreover, the fracture elongation ratio of the material wire 1 and the material wire 2 was $\epsilon_1/\epsilon_2=1.08$ to 1.70. The elongation percent SL at 5 kg loading of the steel cords was SL= 0.13 to 0.50 percent.

To select and determine the range of values of fracture elongation of each material wire, we changed the diameter and interval of the cone pins, the degree of pushing in, the tension of the material wire, etc. in various ways for each material and adjusted the number of revolutions of the overstranding roller after stranding, the degree of pushing in of the straightening roller, etc.

Moreover, the value of the elongation percent SL of the cord at 5 kg loading is not necessarily determined by the ratio of fracture elongation WE ($=\epsilon_1/\epsilon_2$) of the material wire 1 to the material wire 2 but rather relates to the stranding of the material wire 1 and the material wire 2, such as the size of the outside diameter of the spiral curl shape of the material wire 2, for example. We therefore decided the range of values of the elongation percent SL by adjusting the cone pins, etc. in the same way as for each material wire mentioned earlier.

Next, we prepared steel cords of various constructions by stranding a plural number of material wires consisting of hard steel wires of a carbon content of 80% provided with brass plating on the surface by means of a buncher stranding machine in the same way as the above example by changing in various ways material wire diameter, number of material wires, number of material wires having small spiral-like curls, outside diameters of such curls, ratio of fracture elongation WE ($=\epsilon_1/\epsilon_2$) of the material wires having small spiral-like curls to straight material wires and low-load elongation percent of the cord (5 kg load).

In this experiment, we produced spiral curls in all filaments of the conventional steel cords (experiment Nos. 1, 2, 6, 7, 13 and 14) by passing them among 3 to 5 pins of a curling cone provided before the converging point of stranding. The experiment Nos. 1, 6, 13 represent cords of closed stranding of the constructions indicated in FIG. 6a, FIG. 6b and FIG. 6d, respectively, while the experiment Nos. 2, 7, 14 are cords of open stranding indicated in FIG. 7a, FIG. 7b and FIG. 7d, respectively.

To realize an open strand construction as in experiment Nos. 2, 7, 14, we made excessive curls by slightly changing the diameter and intervals of the cone pins, the material wire tension, etc. from those in the case of closed stranding.

In the steel cords of the reference examples (experiment Nos. 3, 8, 9, 15) and the examples of the present invention (experiment Nos. 4, 5, 10–12, 16, 17), we used the same curling means as above for the straight material wires. To produce small spiral-like curls in material wire, we passed the material wire among a plural number of pins provided on a curling device and rotated that curling device at a high speed with the material wire as the pivot to provide the passing material wire with small spiral-like curls, and then passed the wire among a plural number of curling cone pins provided immediately before the converging point of the twist to provide it with spiral curls for twisting.

Figure 5A:
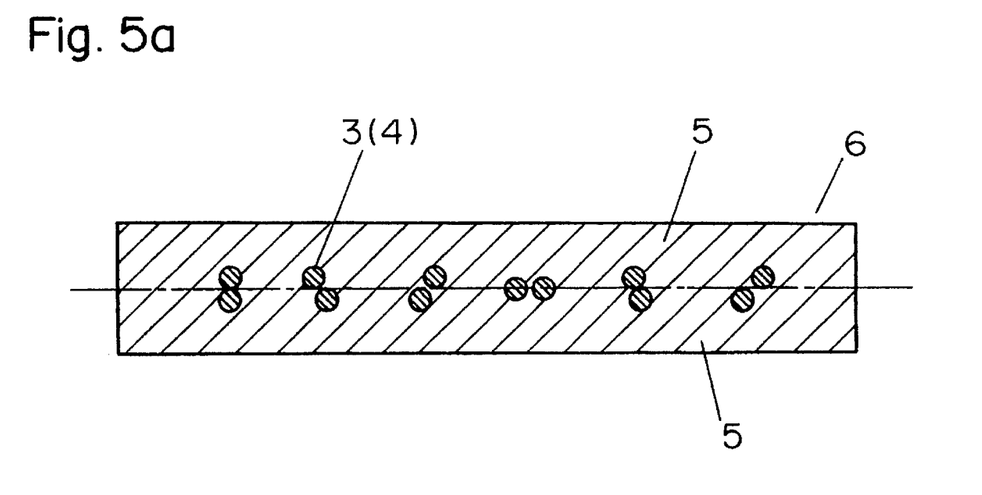
FIG. 5a is a sectional view of a complex sheet and FIG. 5b is a schematic sectional view of the complex sheet used for the belt of a tire.
Figure 5B:
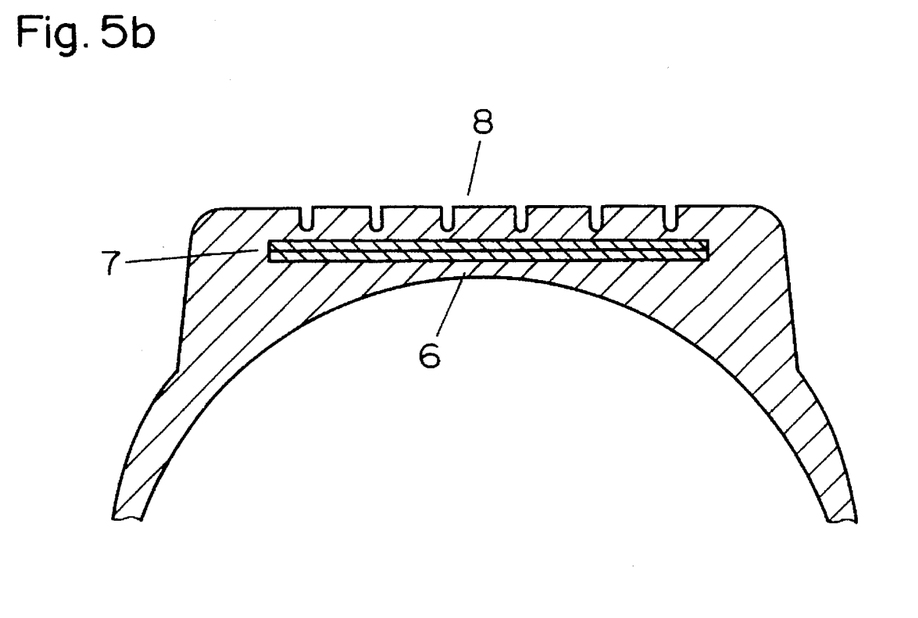

By using the steel cords of experiment Nos. 1–17, we prepared complex sheets 6 by pressurizing and vulcanizing the steel cords pinched between two rubber sheets 5, 5 as indicated in FIG. 5a, and used such complex sheet 6 for the belt 7 of a tire 8 (FIG. 5b).

We also evaluated the fracture strength in each state of various steel cords, the penetration ratio of the rubber compound between material wires during vulcanization of the rubber compound, the compressive tensile bending and fatigue resistance as integrated with the rubber compound, the elongation percent of the cord at 5 kg loading, and the handling workability during processing of the automobile tires, respectively. Table 1 indicates the results of such evaluation.

In the Table, P indicates the stranding pitch, NS the number of material wires having small spiral-like curls, d the diameter of such material wires, $d_f$ the outside diameter of the curls of such material wires, de the wire diameter of the material wires having twist curls only, WE the ratio of the fracture elongation of the material wires having small spiral-like curls to the fracture elongation of the material wires having only twist curls, RP the penetrability of the rubber compound, SL the elongation percent of the cord at 5 kg loading, RP the compressive tensile bending and fatigue resistance and HW the handling workability.

TABLE 1

| Experiment No. | P mm | NS | d mm | $d_1$ mm | $D_0$ mm | WE | FS kgf | RS | RP % | SL % | RF | HW | Construction of cord |
|---|---|---|---|---|---|---|---|---|---|---|---|---|---|
| 1 | 14 | 0 | — | — | 0.30 | — | 42.4 | 70 | 0 | 0.13 | 100 | ○ | 1 × 2 |
| 2 | 14 | 0 | — | — | 0.30 | — | 42.0 | 70 | 90 | 0.67 | 105 | X | " |
| 3 | 14 | 1 | 0.30 | 0.32 | 0.30 | 1.06 | 42.3 | 68 | 70 | 0.14 | 98 | ○ | " |
| 4 | 14 | 1 | 0.30 | 0.34 | 0.30 | 1.08 | 42.2 | 72 | 90 | 0.15 | 105 | ○ | " |
| 5 | 14 | 1 | 0.30 | 0.38 | 0.30 | 1.20 | 42.3 | 75 | 95 | 0.23 | 110 | ○ | " |
| 6 | 8 | 0 | — | — | 0.28 | — | 55.2 | 80 | 0 | 0.13 | 100 | ○ | 1 × 3 |
| 7 | 8 | 0 | — | — | 0.28 | — | 54.5 | 80 | 95 | 0.65 | 107 | X | " |

TABLE 1-continued

| Experiment No. | P mm | NS | d mm | $d_1$ mm | $D_0$ mm | WE | FS kgf | RS | RP % | SL % | RF | HW | Construction of cord |
|---|---|---|---|---|---|---|---|---|---|---|---|---|---|
| 8 | 8 | 1 | 0.28 | 0.30 | 0.28 | 1.06 | 54.6 | 80 | 65 | 0.15 | 97 | ○ | " |
| 9 | 8 | 1 | 0.28 | 0.41 | 0.28 | 1.80 | 50.7 | 75 | 100 | 0.28 | 90 | Δ | " |
| 10 | 8 | 1 | 0.28 | 0.35 | 0.28 | 1.15 | 54.4 | 90 | 100 | 0.18 | 118 | ○ | " |
| 11 | 8 | 1 | 0.23 | 0.28 | 0.28 | 1.25 | 54.3 | 91 | 100 | 0.17 | 120 | ○ | " |
| 12 | 8 | 1 | 0.28 | 0.37 | 0.28 | 1.60 | 52.6 | 85 | 100 | 0.23 | 105 | ○ | " |
| 13 | 10 | 0 | — | — | 0.25 | — | 70.0 | 80 | 0 | 0.14 | 100 | ○ | 1 × 5 |
| 14 | 10 | 0 | — | — | 0.25 | — | 68.2 | 80 | 100 | 0.60 | 110 | X | " |
| 15 | 10 | 1 | 0.25 | 0.42 | 0.25 | 1.85 | 62.3 | 73 | 100 | 0.40 | 90 | Δ | " |
| 16 | 10 | 1 | 0.25 | 0.32 | 0.25 | 1.40 | 67.9 | 85 | 100 | 0.20 | 113 | ○ | " |
| 17 | 10 | 1 | 0.25 | 0.37 | 0.25 | 1.70 | 67.0 | 85 | 100 | 0.35 | 100 | ○ | " |

The evaluation in the above test was performed in the following way:

Fracture Strength FS

This is the breaking load of the steel cord only before its burial in the rubber sheet.

Residual Strength after Fatigue Test, RS

We buried a plural number of steel cords in a rubber sheet, performed repetitions of bending fatigue (test) with this sheet a certain number of times by using a 3-point pulley bending fatigue tester, took out the cords form the rubber sheet, measured the fracture strength, compared it with the fracture strength before the fatigue test and showed them in index respectively.

Penetration Ratio of Rubber Compound, RP (%)

After burying each cord in a rubber compound (ordinary rubber compound used as a tire breaker for burying the steel cord), the 100% modules of which is 35 kg/cm$^2$, and vulcanizing it in with a tensile load of 5 kg applied to each cord, we extracted the steel cord, observed it at a certain length by decomposing it, and indicated the ratio of the length having a trace of contact with the rubber compound to the observed length in percentage. This value must be no less than 60.

Elongation Percent of Cord at 5 kg Loading, SL (%)

This is the elongation percent of each cord and shall preferably be no more than 0.40% from the viewpoints of handling workability and stability of stranding.

Compressive Tensile Bending and Fatigue Resistance, RF

A plural number of steel cords were buried in a rubber sheet and the compressive tensile bending and fatigue resistance was evaluated with this sheet by using a 3-point pulley bending fatigue tester. The results of the test are expressed in index against a base of 100 of the conventional example of the cord of closed stranding of experiment Nos. 1, 6, 13. The cord is eventually broken by fretting wear, buckling, etc. and the evaluation was made by the number of times of repetition up to the time of breaking.

Handling Workability HW

This means the handling workability of the steel cord during manufacture and in the forming process of the complex sheet, including ease of flaring, low-load elongation, intertwisting between steel cords, straightness, etc. of the steel cord. The results for these tests were shown as x if much inferior compared with the conventional cord of closed stranding, Δ if slightly inferior, and ○ if there is no difference between the two. The values of WE $(=\epsilon_1/\epsilon_2)$ in the reference example and the example are indicated in the mean value of all $\epsilon_1/\epsilon2$ values obtained by measuring $\epsilon_1$, $\epsilon_2$ in each material wire and combining them.

In Table 1, the conventional examples of experiment Nos. 1, 6, 13 represent cords of closed stranding with excellent stability of stranding, small low-load elongation and excellent handling workability HW but with poor penetrability of rubber compound RP.

The conventional examples of experiment Nos. 2, 7, 14 represent cords of open stranding having a mean shaping ratio (cord diameter at the time when the material wires are stranded with a clearance between the respective wires/cord diameter at the time when the material wires are stranded tight×100) of 116 to 120%. Those examples showed excellent penetrability RP of rubber compound and compressive tensile bending and fatigue resistance RF but poor handling workability HW with a large elongation percent SL of the cord at 5 kg loading.

The reference example of experiment Nos. 3, 8, 9, 15 are steel cords made by using material wires having small spiral-like curls and with the ratio WE of a value different from that of the present invention. The experiment Nos. 3, 8 were inferior in residual strength RS and compressive tensile bending and fatigue resistance RF because their ratio WE was smaller than the lower limit value of 1.08 while the experiment Nos. 5, 15 were inferior in fracture strength FS, residual strength RS, compressive tensile bending and fatigue resistance RF and handling workability HW because their ratio WE was larger than the upper limit value 1.70.

On the contrary, the steel cords of the present invention of the experiment Nos. 4, 5, 10–12, 16, 17 were satisfactory in all of fracture strength FS, residual strength RS, penetrability of rubber compound, elongation percent SL of the cord at 5 kg loading, compressive tensile bending and fatigue resistance RF and handling workability HW.

Among the steel cords of 1×3 construction, the steel cords of experiment Nos. 10, 11 included in the range of WE=1.1 to 1.3 and SL=0.15 to 0.20 proved to be apparently superior to the steel cord of experiment No. 12 in fracture strength FS, residual strength RS and compressive tensile bending and fatigue resistance RF.

Moreover, we also evaluated the steel cords of 1×4 and 1×6 constructions in the same way as above. As a result, the steel cords of the present invention showed about the same tendencies as above and satisfied all the items of evaluation, proving to be most appropriate as material for reinforcement of automobile tires.

What is claimed is:

1. A steel cord for reinforcement of automobile tires, comprising:

at least one first material wire preformed with small wavy spirals having a predetermined first pitch $P_1$;

1 to 5 second material wires;

wherein said at least one first material wire is twisted together with said 1 to 5 second material wires at a second pitch P;

wherein said steel cord is of a 1×n construction, where n=2 to 6;

wherein said second pitch is substantially greater than said first pitch;

wherein a ratio WE of fracture elongation $\epsilon_1$ of said at least one first material wire to a fracture elongation $\epsilon_2$ of said 1 to 5 second material wires is 1.08 to 1.70; and wherein an elongation percent SL of said steel cord under a tensile load of 5 kg is 0.13 to 0.50%.

2. A steel cord as recited in claim 1, wherein a diameter d of each of said first and second material wires is related to an outside diameter $d_1$ of the small wavy spirals of said at least one first material wire, so that $d_1=(d+2/100$ mm$)$ to $(d+2/10$ mm$)$.

3. A steel cord as recited in claim 1, wherein a diameter of each of said first and second material wires is 0.10 to 0.50 mm.

4. A steel cord as recited in claim 1, wherein said first pitch $P_1$ is related to said second pitch P so that $P_1=0.1\ P$ to $0.7\ P$.

5. A steel cord as recited in claim 1, wherein said second pitch P is 8 to 16 mm.

6. A steel cord for reinforcement of automobile tires, comprising:

one first material wire preformed with small wavy spirals having a predetermined first pitch $P_1$;

two second material wires;

wherein said one first material wire is twisted together with said two second material wires at a second pitch P, such that said steel cord is of a 1×3 construction;

wherein said second pitch is substantially greater than said first pitch;

wherein a ratio WE of fracture elongation $\epsilon_1$ of said one first material wire to a fracture elongation $\epsilon_2$ of said two second material wires is 1.10 to 1.30; and wherein an elongation percent SL of said steel cord under a tensile load of 5 kg is 0.15 to 0.20%.

7. A steel cord as recited in claim 6, wherein a diameter d of each of said first and second material wires is related to an outside diameter $d_1$ of the small wavy spirals of said first material wire, so that $d_1=(d+2/100$ mm$)$ to $(d+2/10$ mm$)$.

8. A steel cord as recited in claim 6, wherein a diameter of each of said first and second material wires is 0.10 to 0.50 mm.

9. A steel cord as recited in claim 6, wherein said first pitch $P_1$ is related to said second pitch P so that $P_1=0.1\ P$ to $0.7\ P$.

10. A steel cord as recited in claim 6, wherein said second pitch P is 8 to 16 mm.

* * * * *